(12) United States Patent
Bergman et al.

(10) Patent No.: US 6,312,611 B1
(45) Date of Patent: *Nov. 6, 2001

(54) APPARATUS FOR DISTRIBUTING GAS AND LIQUID DURING CONCURRENT GAS/LIQUID BACKWASH IN FILTER UNDERDRAIN FLUMES

(75) Inventors: Eugene O. Bergman, St. George, UT (US); Richard W. Hsieh, Cranberry Township Butler County; John Geibel, Butler, both of PA (US)

(73) Assignee: The F.B. Leopold Co., Inc., Zelienople, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/015,390

(22) Filed: Jan. 29, 1998

Related U.S. Application Data

(63) Continuation-in-part of application No. PCT/US97/13512, filed on Jul. 31, 1997
(60) Provisional application No. 60/023,116, filed on Jul. 31, 1996.

(51) Int. Cl.[7] .................................................... B01D 24/46
(52) U.S. Cl. ......................... 210/793; 210/274; 210/275; 210/293
(58) Field of Search .................................. 210/794, 275, 210/274, 293, 795, 793

(56) References Cited

U.S. PATENT DOCUMENTS

| 801,810 | 10/1905 | Parmelee . |
| 1,142,270 | 6/1915 | Reisert . |
| 2,154,167 | 4/1939 | Jenks .................................... 210/122 |
| 2,716,490 | 8/1955 | Barstow ............................... 210/130 |
| 4,064,050 | 12/1977 | Heaney et al. ....................... 210/293 |
| 4,065,391 | 12/1977 | Farabaugh ........................... 210/274 |

(List continued on next page.)

OTHER PUBLICATIONS

Letter and sketches to Dr. Susumu Kawamura, P.E. dated Feb. 7, 1995 (9 pages).

Primary Examiner—Chester T. Barry
(74) Attorney, Agent, or Firm—Webb Ziesenheim Logsdon Orkin & Hanson, P.C.

(57) ABSTRACT

A concurrent backwash distribution apparatus for a filter having a filter tank and a plurality of underdrain laterals includes a baffle positioned in a common main conduit to define an auxiliary flume between the baffle and the underdrain laterals. The auxiliary flume is in fluid communication with the common main conduit and the underdrain laterals. The baffle has at least one flume liquid metering orifice preferably located near the bottom of the baffle so that it may be below a gas/liquid interface in the auxiliary flume during concurrent gas/liquid backwash operations. A flow distribution plate may be positioned between the auxiliary flume and the underdrain laterals, the flow distribution plate having at least one liquid metering orifice and at least one gas metering orifice. The baffle may take one of many forms. The baffle creates an adequate liquid pool in the common main conduit for low velocity flow of backwash liquid while at the same time providing uninhibited flow of backwash gas. Maldistribution is thereby controlled. Stand-pipes may be used in place of the baffle. A method for concurrent gas/liquid backwash according to the invention is also disclosed. The invention may be applied to flat bottom flumes or insufficiently recessed flumes.

32 Claims, 17 Drawing Sheets

U.S. PATENT DOCUMENTS

| | | | |
|---|---|---|---|
| 4,196,079 | 4/1980 | Ward | 210/80 |
| 4,338,202 | 7/1982 | Louboutin | 210/795 |
| 4,435,286 | 3/1984 | Louboutin et al. | 210/116 |
| 4,604,197 | 8/1986 | Louboutin et al. | 210/150 |
| 4,627,923 | 12/1986 | Ross | 210/744 |
| 4,995,990 | 2/1991 | Weston | 210/793 |
| 5,068,034 | 11/1991 | Walter | 210/232 |
| 5,087,362 | 2/1992 | Brown | 210/293 |
| 5,089,147 | 2/1992 | Ross | 210/793 |
| 5,137,645 | 8/1992 | Miller | 210/793 |
| 5,156,738 | 10/1992 | Maxson | 210/274 |
| 5,160,614 | 11/1992 | Brown | 210/275 |
| 5,232,592 | 8/1993 | Brown et al. | 210/274 |
| 5,296,138 * | 3/1994 | Walter . | |
| 5,328,608 | 7/1994 | Bergmann et al. | 210/274 |
| 5,362,384 | 11/1994 | Whetsel | 210/85 |
| 5,401,405 | 3/1995 | McDougald | 210/273 |
| 5,413,710 | 5/1995 | Roberts et al. | 210/274 |
| 5,462,664 | 10/1995 | Neuspiel | 210/274 |
| 5,512,174 | 4/1996 | Capon | 210/264 |
| 5,639,384 * | 6/1997 | Brown et al. | 210/794 |

\* cited by examiner

APPARATUS FOR DISTRIBUTING GAS AND LIQUID DURING CONCURRENT GAS/LIQUID BACKWASH IN FILTER UNDERDRAIN FLUMES

CROSS REFERENCE TO RELATED APPLICATIONS

This application is a continuation-in-part of PCT application Ser. No. PCT/US97/13512, filed Jul. 31, 1997, which designates the United States and claims the benefit of U.S. Provisional Patent Application Ser. No. 60/023,116, filed Jul. 31, 1996.

BACKGROUND OF THE INVENTION

1. Field of the Invention

This invention relates to apparatus for distributing gas and liquid simultaneously from a common main conduit to filter underdrains for backwash of filter media.

2. Description of the Prior Art

In a typical gravity filter for filtering water and wastewater, one or more filter tanks are arranged in adjacent or opposing batteries. Filter underdrain laterals are laid on the floor of the filter tank one next to the other in parallel rows to define gas and liquid flow conduits below a bed of filtering media. The conduits make possible the collection of filtered liquid during filtration and the distribution of gas and liquid for backwash. A common main conduit (known as a "flume") is located immediately next to the filter tank to collect the filtered liquid from the underdrain laterals during filtration and to distribute gas or liquid to the underdrain laterals during gas (typically air) or liquid (typically water) backwash. The common main conduit also distributes gas and liquid simultaneously to each of the underdrain laterals during concurrent gas and liquid backwash. In some installations, the common main conduit has its floor located somewhat lower than the elevation of the filter floor (see FIG. 2) or even on the same elevation as the filter floor (see FIG. 1). Consulting engineers and contractors prefer these arrangements, known as "recessed flume" and "flat bottom flume", because they are easier and cheaper to install. In retrofitting old filters with new underdrains, it is preferable to maintain the existing flume structure to reduce costs.

The interface of gas and liquid in the underdrain laterals during concurrent gas and liquid backwash is only a few inches above the filter floor. The interface of gas and liquid in the common main conduit at this time would be even lower than that inside the laterals due to friction loss through the wall sleeves. The wall sleeves connect the common main conduit to the underdrain laterals. There is, therefore, practically no room in flat bottom flumes and insufficient room in some recessed flumes for distribution of liquid to the underdrain laterals during concurrent gas and liquid backwash. In these cases, the air space is disproportionately large in the common main conduit.

In order to provide near uniform distribution of liquid to the underdrain laterals, the maximum flow velocity of liquid inside the common main conduit should be limited to two feet per second or lower. Generally, the smaller the cross-sectional area for the flow path of liquid, the greater the velocity. Since the floor of the conduit is on the same elevation as the filter floor in flat bottom flumes, and the floor of some flumes may be insufficiently recessed, the only way to provide a greater cross-sectional area for the flow of liquid to keep maximum velocity at less than two feet per second is to raise the interface of gas and liquid from the floor or deepen the flume recess. If the flume is insufficiently recessed, as shown in FIGS. 8 and 9, passage for the gas to the underdrain laterals may be blocked by the liquid during concurrent gas/liquid backwash.

The alternatives are to provide adequate room below the interface of gas and liquid inside the common main conduit by lowering the floor elevation for liquid distribution (see FIG. 3), or by providing separate means for the controlled conveyance and distribution of gas and liquid (see FIGS. 4, 5, 6 and 7).

In the case of FIG. 3, extra excavation, form work and concrete structural work are required. This is very expensive for both retrofit jobs and new construction. In addition, baffles or individual wall sleeves with lateral inlet elbows are required to direct liquid to the laterals. In the case of FIGS. 4, 5, 6 and 7, a stainless steel gas header with tubular branches to each individual underdrain lateral is very expensive to fabricate and install. The individual gas tubes from the gas header to each underdrain lateral, shown in FIGS. 6 and 7, may cause cross connection problems between unfiltered and filtered water if leaks occur, since the individual tubing must go through the filter media bed.

It is, therefore, an object of this invention to create more room inside the common main conduit by raising the interface of gas and liquid in a unique manner during concurrent gas and liquid backwash, while at the same time providing clear passages inside the common main conduit for gas flow to the underdrain laterals. This is to be accomplished without raising the overall dynamic pressure within the backwash system.

SUMMARY OF THE INVENTION

Accordingly, there is provided a concurrent backwash distribution apparatus for a filter having a filter tank. The filter tank may have a plurality of underdrain laterals positioned in the filter tank and a filter media bed positioned above the underdrain laterals. A common main conduit (or "flume") is positioned adjacent the filter tank and in fluid communication with the filter tank. A floor of the filter tank is somewhat above the floor of the common main conduit, or has the same elevation as the floor of the common main conduit.

The concurrent backwash distribution apparatus comprises a separator device positioned in the common main conduit so that it defines an auxiliary flume between the separator device and the filter tank. The auxiliary flume is in fluid communication with the common main conduit and the filter tank. The separator device has at least one flume liquid metering orifice.

A flow distribution plate may be positioned between the auxiliary flume and underdrain laterals in the filter tank, the flow distribution plate having at least one lateral liquid metering orifice and at least one gas metering orifice. The lateral liquid metering orifice may be contiguous with its corresponding gas metering orifice forming an inverted T-shape, or other shapes or configurations.

The separator device may be a baffle which preferably extends to a height which is less than a height of the common main conduit to define a clearance above the baffle. The flume liquid metering orifice is preferably positioned in a lower part of the separator device, but can be positioned at any appropriate location in the separator device according to the particular design of the common main conduit and the filter tank with which it is connected.

The apparatus may include a filter tank wall separating the auxiliary flume and the filter tank, the filter tank wall having at least one opening therein for fluidly connecting the auxiliary flume with the filter tank. The flow distribution plate may be positioned between the filter tank wall and laterals in the filter tank. The opening in the filter tank wall is preferably sufficiently large to provide passage of both gas and liquid therethrough during concurrent gas/liquid backwash operations.

The baffle may be an upstanding partition positioned in the main conduit and spaced from a sidewall thereof. Alternatively, the baffle may be an inverted L-shaped partition, having a vertical portion and an upper horizontal portion. The upper horizontal portion has a plurality of openings therein to facilitate gas flow and excess fluid flow. Further possible alternatives include an L-shaped baffle and a crescent-shaped baffle.

As an alternate to the baffles, a stand-pipe can also be provided for each lateral. The liquid metering orifices can be provided at appropriate locations on the stand-pipes to meter liquid flow from the flume to the stand-pipe during gas/liquid concurrent backwash.

The invention also includes a method of introducing a backwash gas and a backwash liquid to a filter having a filter tank. Particularly, the method includes concurrently introducing the backwash gas and backwash liquid into an enclosed flume positioned adjacent the filter tank. A first gas/liquid interface is established in the enclosed flume, and backwash liquid is then passed through at least one flume liquid metering orifice which is in fluid communication with the enclosed flume.

A second gas/liquid interface is established in the enclosed flume, the second gas/liquid interface being positioned below the first gas/liquid interface. Backwash liquid is passed into the filter tank through an opening in a filter tank wall separating the enclosed flume and the filter tank. Finally, backwash gas is passed through an opening which is above the second gas/liquid interface and below the first gas/liquid interface from the enclosed flume into the filter tank simultaneously with the backwash liquid.

Further details and advantages of the invention will become apparent upon reading the following detailed description, in conjunction with the accompanying drawings, in which like reference numerals represent like parts.

DETAILED DESCRIPTION OF THE PREFERRED EMBODIMENTS

Figure 10:
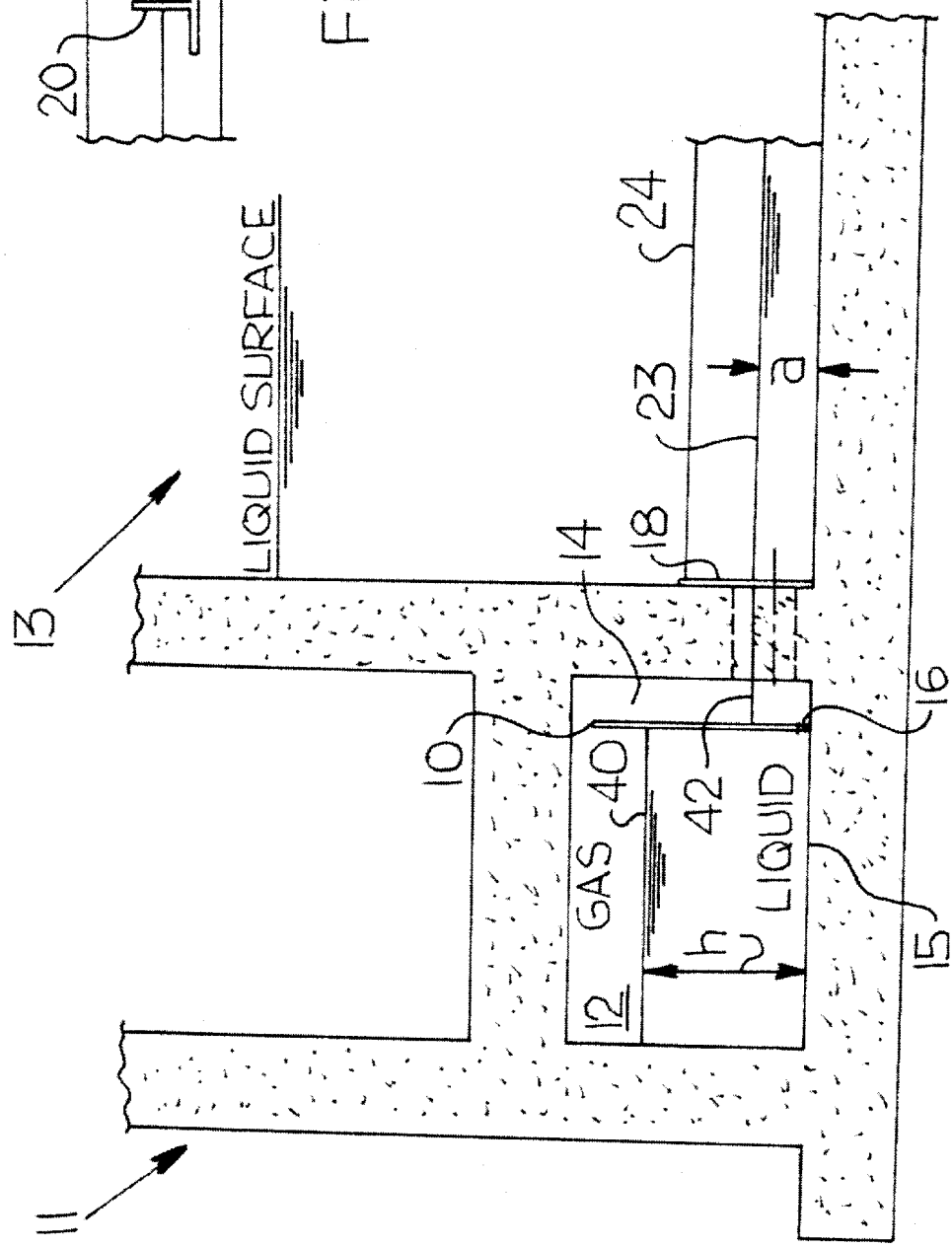
FIG. 10 is a schematic view of a filter having a flat bottom flume with a baffle installed in the flume according to the present invention.
Figure 12:
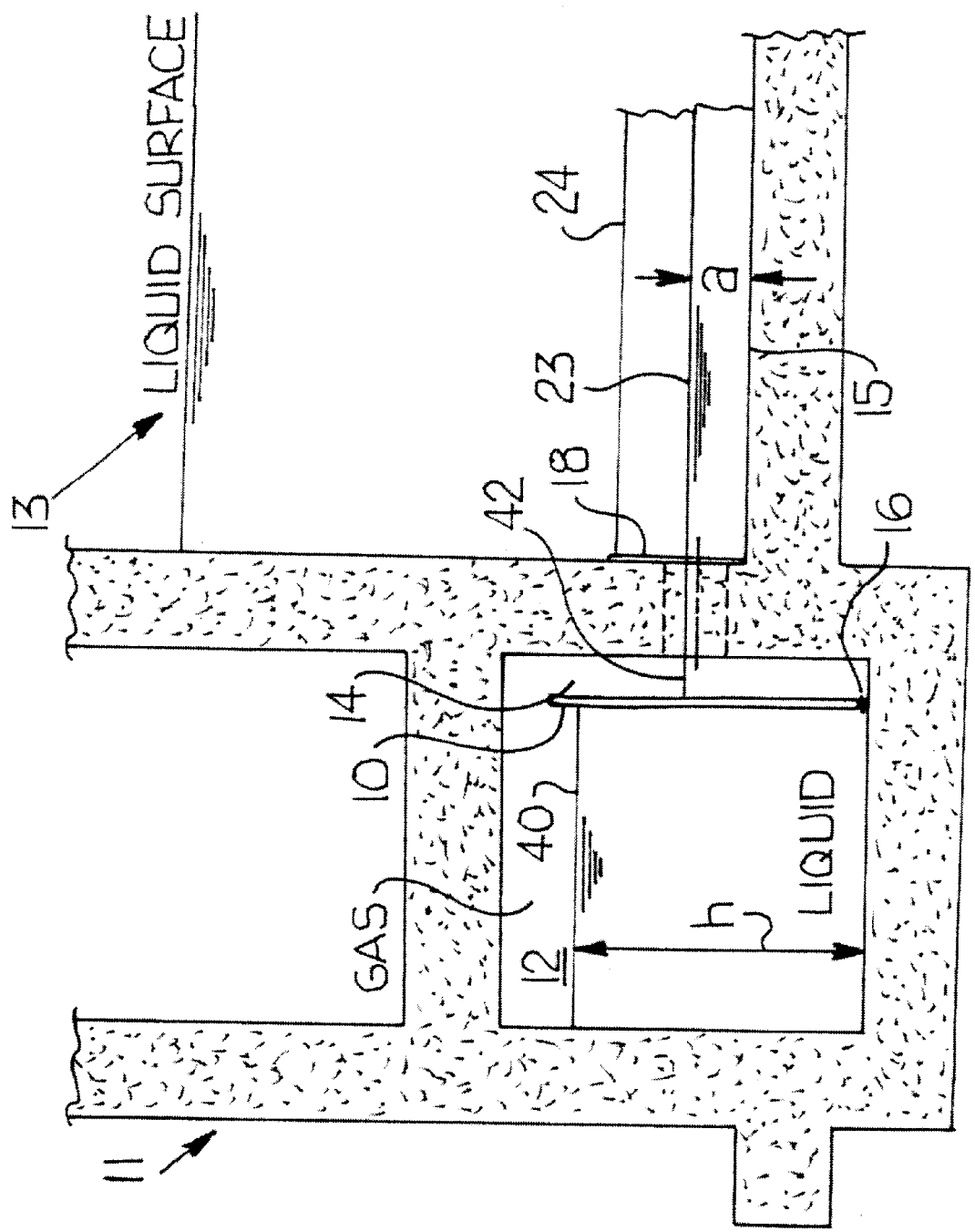
FIG. 12 is a schematic view of a filter having a recessed flume with a baffle installed in the flume according to the present invention.

As shown in FIGS. 10 and 12, the invention includes a separator device in the form of a baffle 10 positioned inside a common main conduit (a.k.a. "flume", "gullet", "channel", "manifold" or "chamber") 12 to create an auxiliary flume 14 within the main conduit. Main conduit 12 is formed in a filter 11 and positioned next to a filter tank 13. Main conduit 12 is enclosed, i.e., it is not open to the atmosphere. In FIG. 10, main conduit 12 and filter tank 13 share a common filter floor 15 so that the floors of main conduit 12 and filter tank 13 are at the same elevation. This is known as a "flat bottom flume" arrangement. In FIG. 12, the bottom or floor of main conduit 12 is somewhat lower than the elevation of filter floor 15. This is known as a "recessed flume" arrangement. Flume liquid metering orifices 16 are preferably located in a lower part of the baffle 10 for the flow of liquid from the main conduit 12 to the auxiliary flume 14 during concurrent gas and liquid backwash. The liquid metering orifices 16 are sized such that the differential pressure across the orifices raises the interface of gas and liquid in the main conduit 12 to a level which provides sufficient cross-sectional area so that the maximum flow velocity of liquid in the main conduit is two feet per second or lower during concurrent gas and liquid backwash. The baffle 10 is sealed at its ends, along the bottom and at any joints so that flume liquid metering orifices 16 are controlling the height of the gas/liquid interface.

The auxiliary flume 14 serves as a passage for the gas and liquid during concurrent gas and liquid backwash. A flow distribution plate 18 (FIG. 11) with gas metering slots 20 and lateral liquid metering orifices 22 of rectangular shape may also be provided. Other shapes and combinations of metering orifices for gas and liquid can also be used.

Although shown schematically at an equal level in FIGS. 10 and 12, an interface 42 of gas and liquid in the auxiliary flume 14 may be lower than an interface 23 in underdrain lateral 24 due to headloss through the gas metering slot 20 in the flow distribution plate 18.

Liquid will flow to the underdrain laterals 24 through the liquid metering orifices 16 and 22 while gas will flow through the auxiliary flume 14 and the gas metering slots 20 and then to the underdrain laterals 24. Where convenient, one extended flow distribution plate 18 having a plurality of gas and liquid metering orifices, one each corresponding to a lateral, may be provided. Alternatively, the flow distribution plate 18 may be dispensed with altogether or incorporated into the inlet end construction of underdrain laterals 24.

For gas only backwash, gas will flow through the auxiliary flume 14 to the underdrain laterals 24, although the interface of gas and liquid in the main conduit 12 would drop to the same level as the interface 42 of gas and liquid in the auxiliary flume 14 because there will be no liquid flow at this time. For backwash with liquid only, there would be no gas/liquid interface and liquid will flow through the auxiliary flume 14 as well as the liquid metering orifices 16 and 22 to the underdrain laterals 24.

Flume liquid metering orifices 16 are preferably positioned below the gas/water interface 42 in auxiliary flume 14, but not necessarily so. Orifices 16 could, for example, be placed in the baffle 10 above interface 42, but measures may then be necessary to insure that water passing through the orifices 16 would not cause undue splashing or turbulence in the auxiliary flume 14, as the water impacts the gas/water interface 42 from above.

Figure 13:
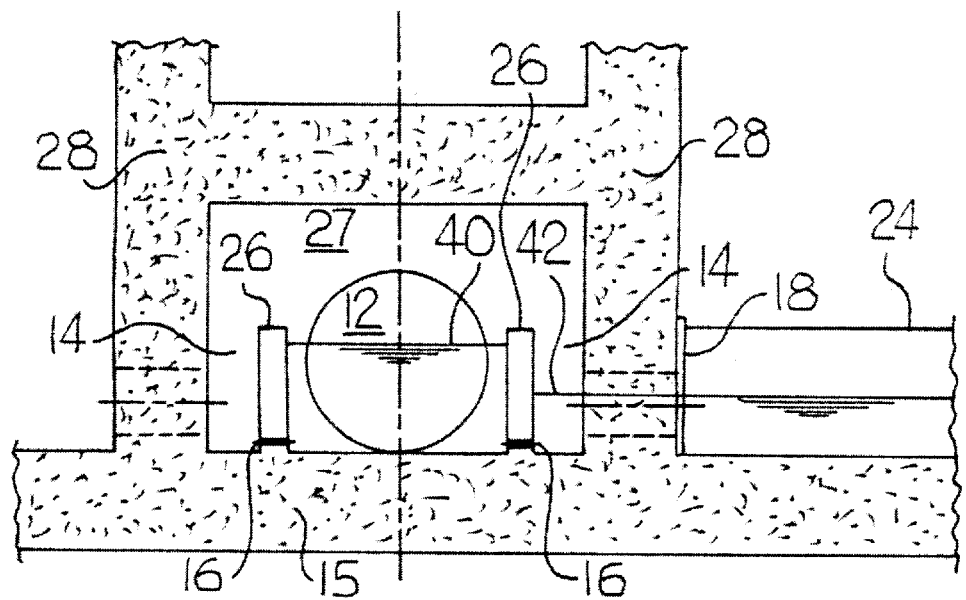
FIGS. 13 and 14 are schematic views of a filter having a center flat bottom flume and a recessed bottom flume, respectively, with two upstanding concrete partitions in the flume according to a second embodiment of the invention.
Figure 14:
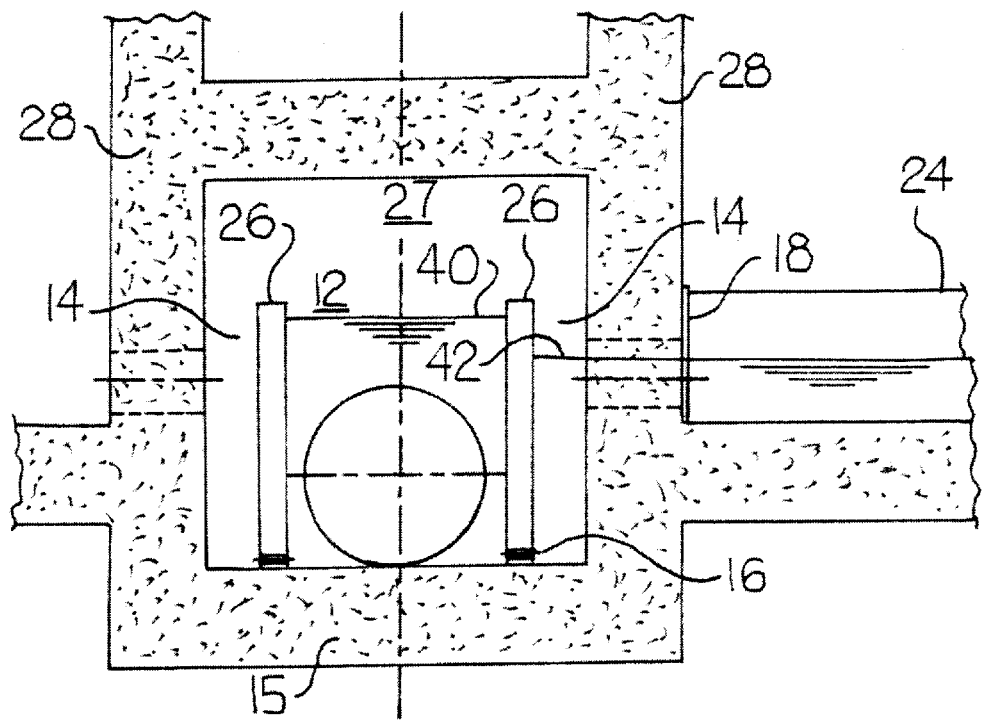

Referring to FIGS. 13 and 14, a second embodiment for the apparatus according to the present invention is shown. Two upstanding concrete partitions 26 are positioned in main conduit 12, each partition spaced from a sidewall 28 of main conduit 12 to form auxiliary flumes 14. As with baffle 10, in FIGS. 10 and 12, the partitions 26 do not extend the full height of main conduit 12 so as to define a clearance 27 for flow of gas and liquid over the tops of the partitions into auxiliary flumes 14. Flume liquid metering orifices 16 are positioned in a lower part of partitions 26 and have a predetermined diameter and spacing. This arrangement is appropriate for filters having center flumes, with a filter tank 13 and underdrain laterals 24 positioned on either side of the main conduit 12. It is contemplated this arrangement could be used in new construction. A flow distribution plate 18 may be present, as discussed above.

Figure 15:
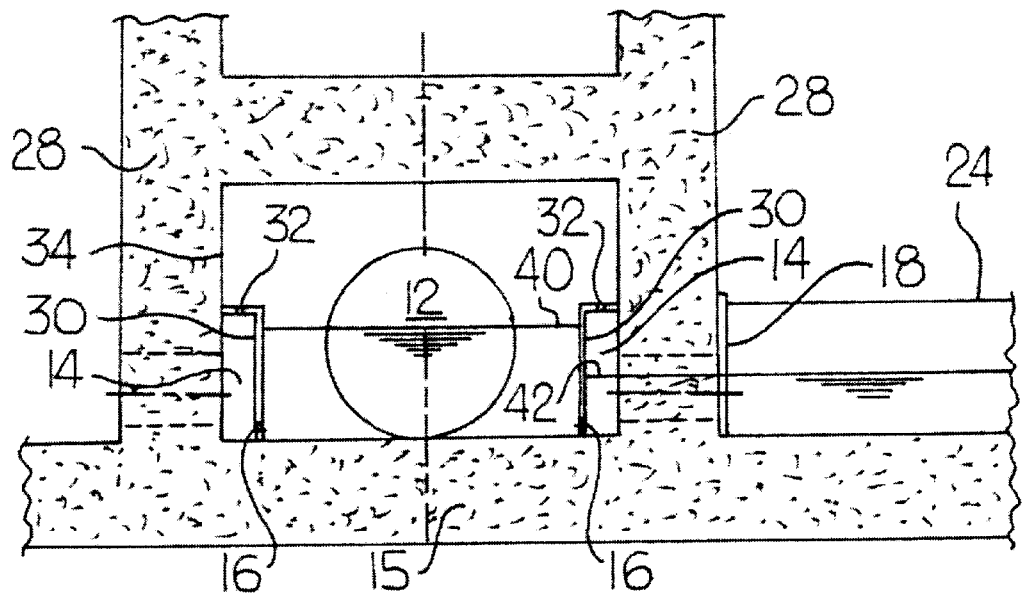
FIGS. 15 and 16 are schematic views of filters having a center flat bottom flume and a recessed bottom flume, respectively, with two inverted L-shaped partitions in the flume according to a third embodiment of the invention.
Figure 16:
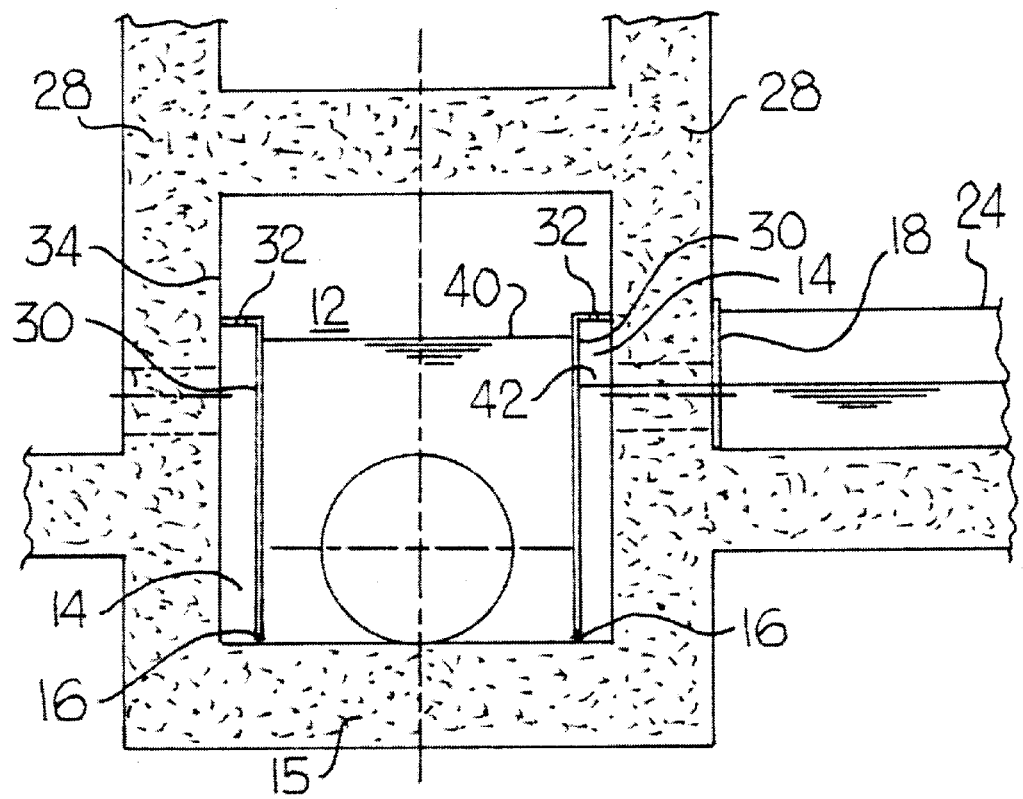

Referring to FIGS. 15 and 16, a third embodiment of the invention is shown. Partitions 30 have an inverted L-shape and are positioned in main conduit 12, which forms part of a center flume, as discussed above. Auxiliary flumes 14 are formed between sidewalls 28 and stainless steel partitions 30. Large holes or openings 32 in an upper horizontal portion 34 of stainless steel partitions 30 provide fluid communication between auxiliary flumes 14 and main conduit 12 for gas flow during gas only and gas/liquid concurrent backwash and also for liquid flow during "liquid only" backwash. Holes 32 may also be positioned in the vertical portion of partition 30.

Flume liquid metering orifices 16 are positioned in a lower part near the bottom of the vertical portion of each partition 30. The remainder of the arrangement is as discussed above. Holes 32 in partitions 30 may, for example, be larger in diameter than flume liquid metering orifices 16 and located along horizontal portion 34 at an appropriate spacing so as not to create undue headloss. The arrangement shown in FIGS. 15 and 16 is an example of an application of the invention to existing facilities, but can also be used for new construction.

Figure 17:
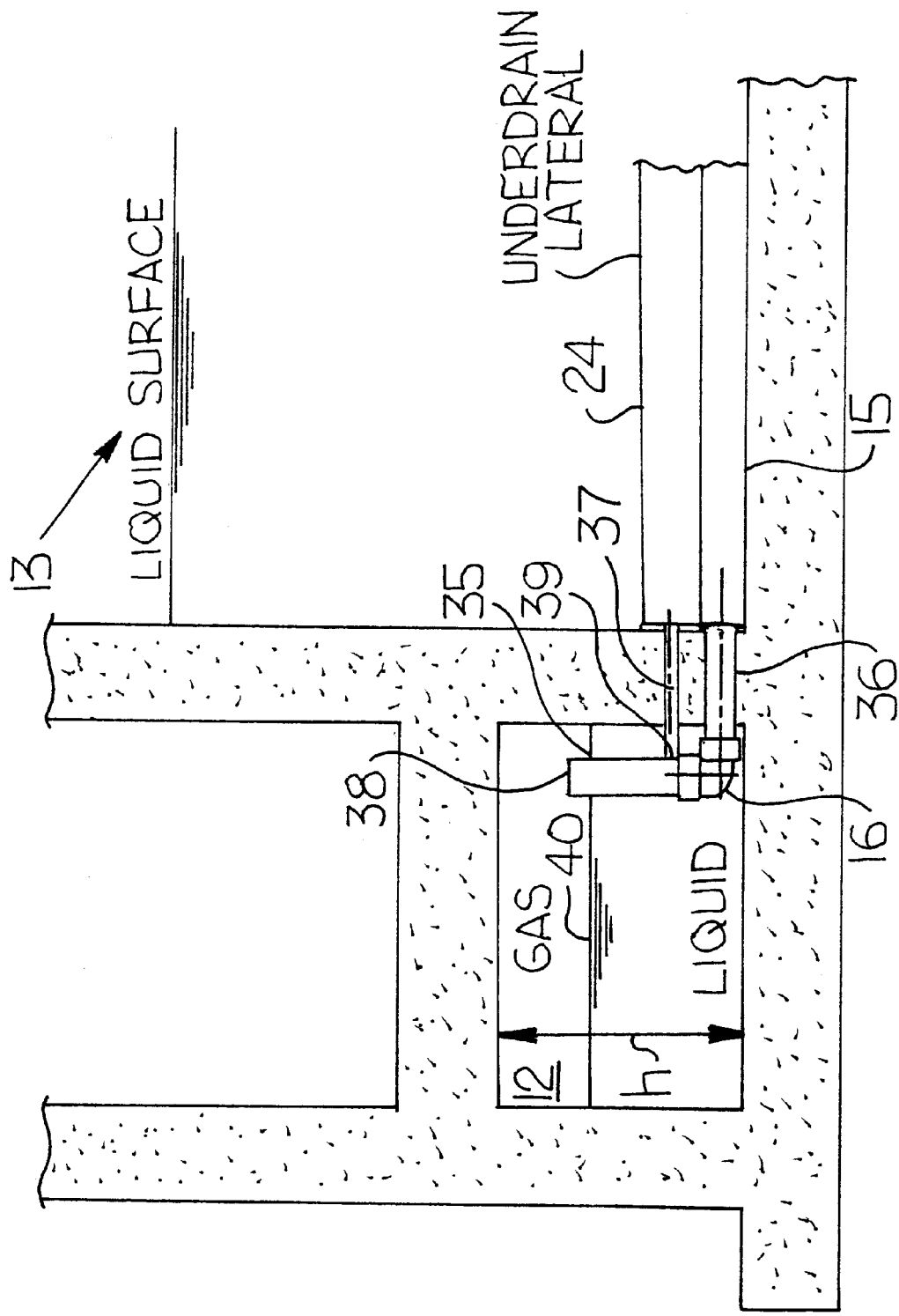
FIGS. 17 and 18 are schematic views of filters having a center flat bottom flume and a recessed bottom flume, respectively, with stand-pipes according to a fourth embodiment of the invention.
Figure 18:
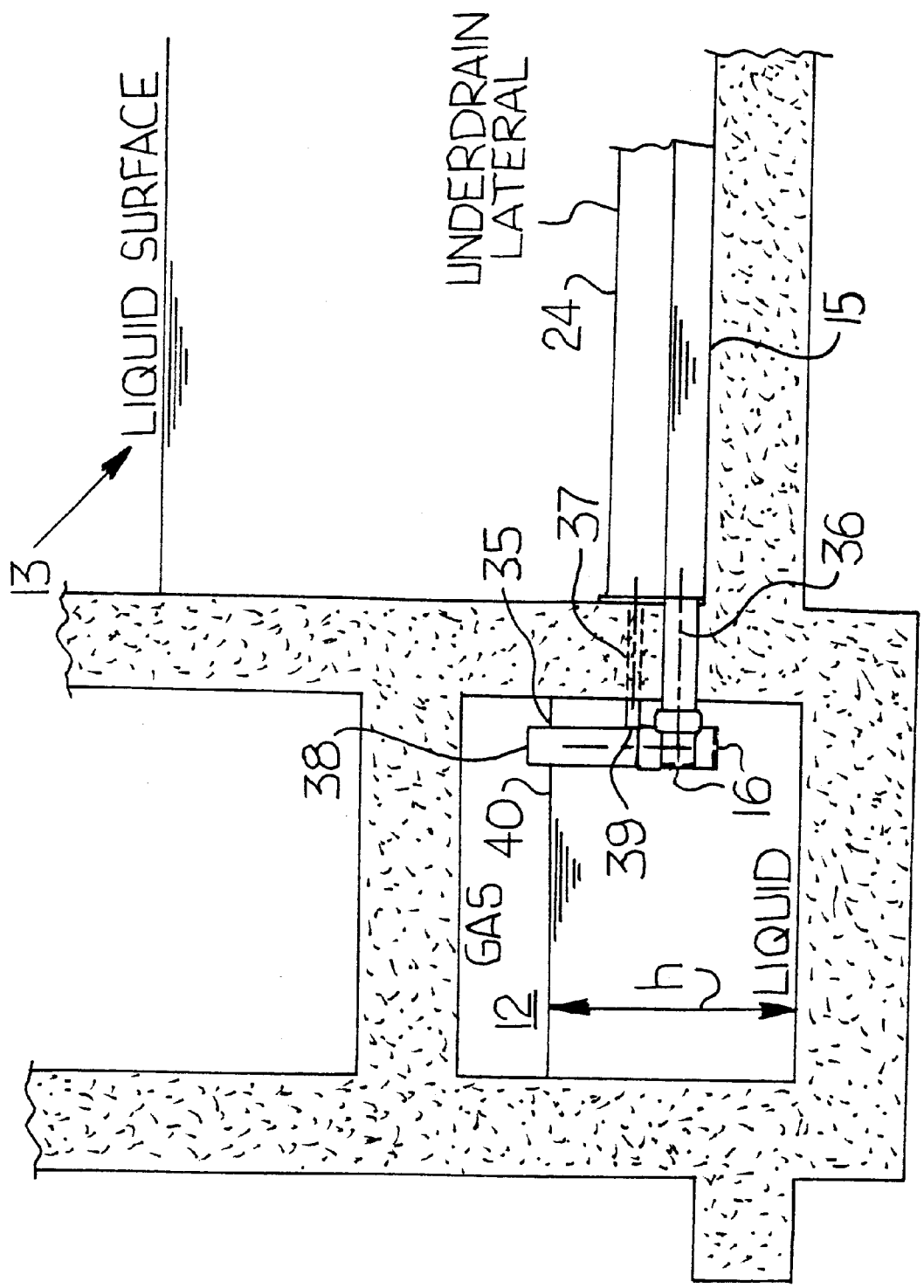

Referring to FIGS. 17 and 18, a fourth embodiment of the invention is shown. Here the separator device is in the form of a stand-pipe 35 with wall sleeves 36 and 37 installed for connecting each lateral in the filter tank with the flume. Liquid metering orifices 16 are located at the lower part of the stand-pipe when the bottom of the main conduit 12 is located on the same elevation as the filter floor 15 (FIG. 17). Liquid metering orifices 16 can also be located at the lower end of the stand-pipe 35 or any appropriate locations on the stand-pipe 35 when main conduit 12 has a recessed bottom (FIG. 18). Flow distribution plate 18, provided with the baffles in previously described alternatives, may not be needed in this fourth embodiment since liquid is metered by the liquid metering orifices 16 during concurrent gas/liquid backwash and is controlled by the top opening 38 of the stand-pipe during liquid only backwash. Also, gas enters top opening 38 and is measured by the opening 39 of wall sleeve 37 during gas only and concurrent gas/liquid backwash. The stand-pipes may be constructed of stainless steel, PVC plastic, fiberglass or other corrosion-resistant materials. A second air/water interface, below the first air water interface in main conduit 12, will be established inside the stand-pipe 35.

Figure 19:
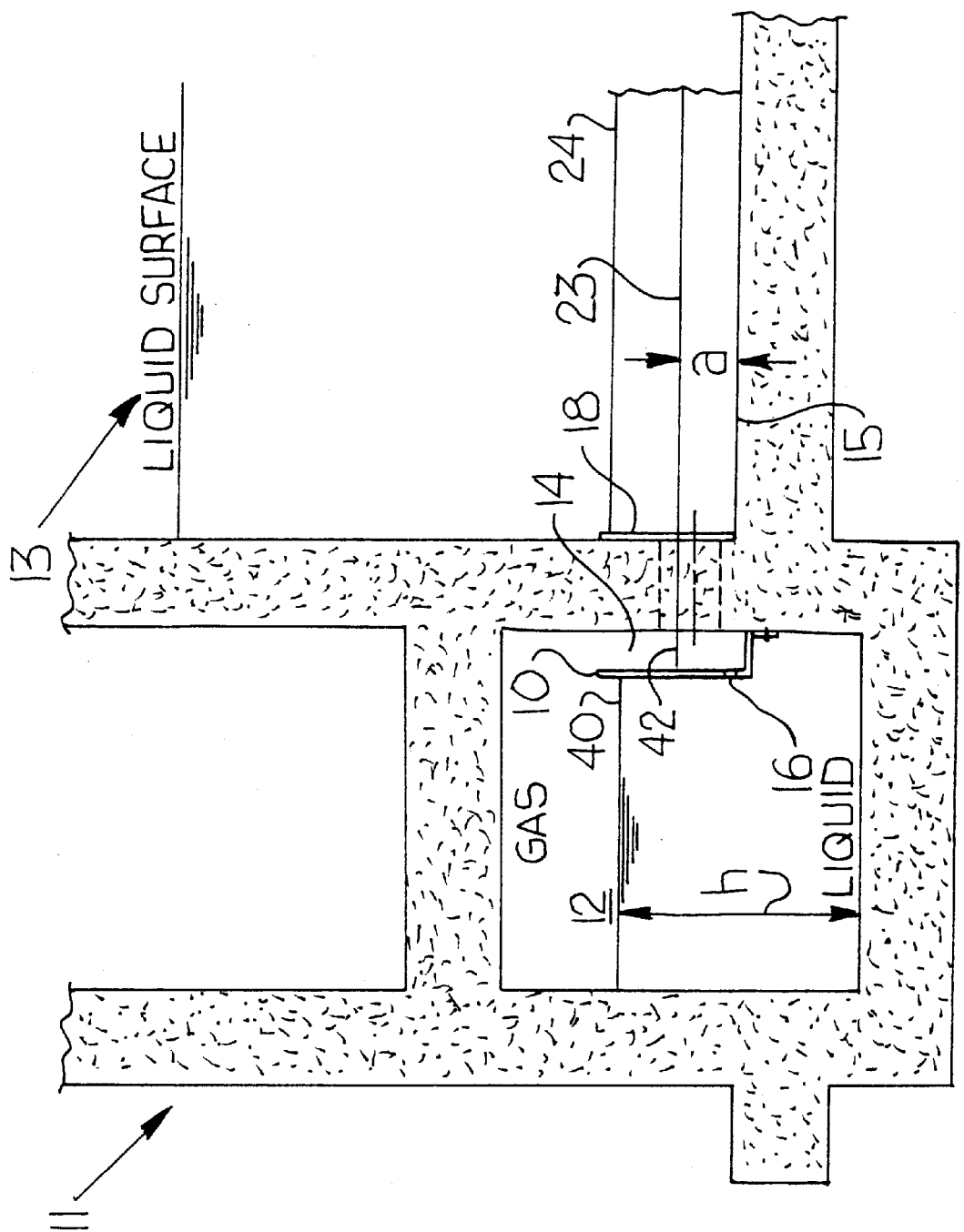
FIG. 19 shows an upright, L-shaped baffle according to a fifth embodiment of the invention.

FIG. 19 shows a fifth embodiment of the invention wherein the baffle 10 is secured and sealed to a sidewall of main conduit 12 in a recessed flume, as opposed to the floor of the common main conduit. The baffle 10 thus has an upright L-shape.

Figure 20:
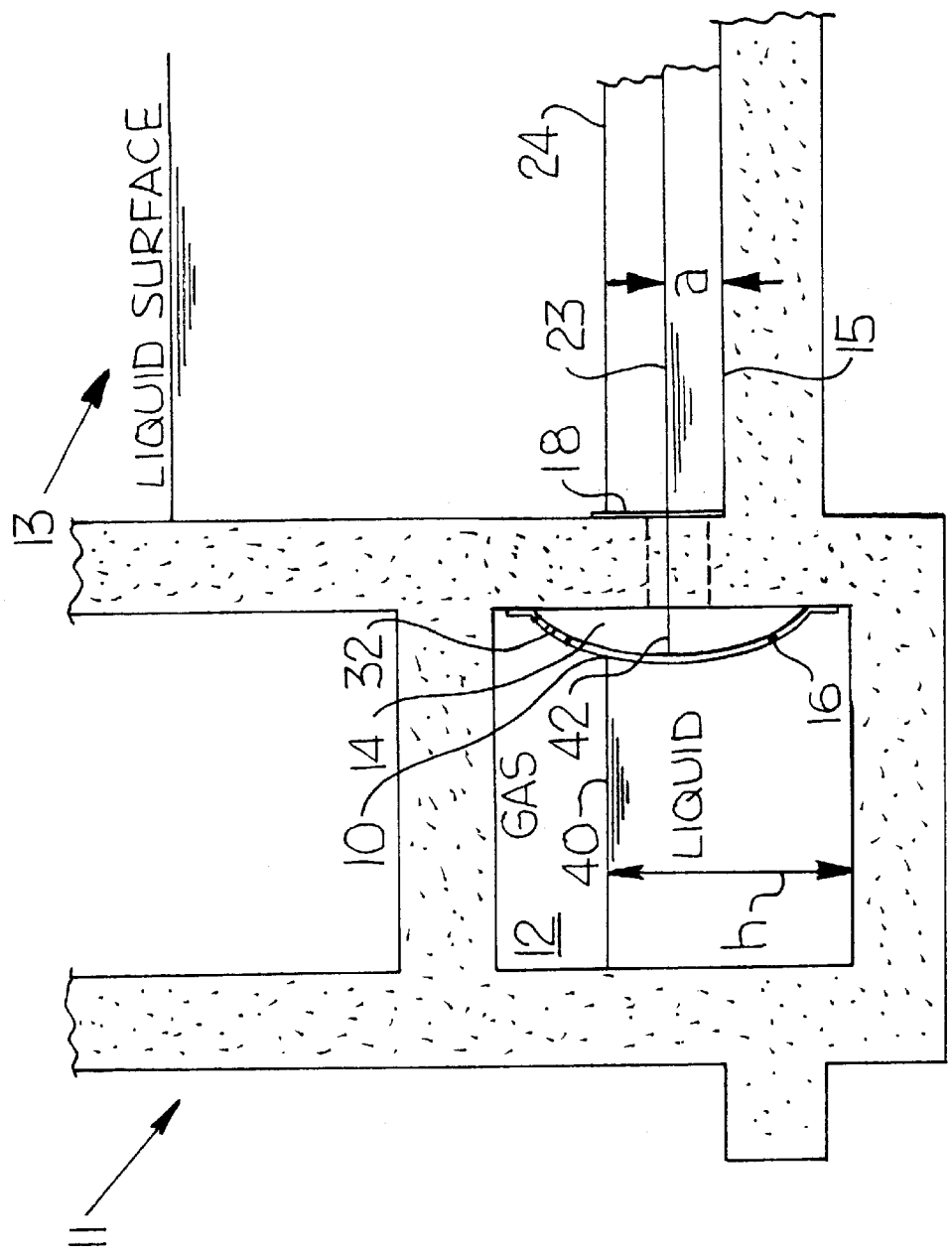
FIG. 20 shows a crescent-shaped baffle according to a sixth embodiment of the invention.

FIG. 20 shows still another sidewall mounted baffle, having a crescent shape, secured and sealed to a sidewall in a recessed flume. Opening 32 in crescent-shaped baffle 10, may be one of a number of large holes or a continuous slot along the length of the baffle for admitting gas into the auxiliary flume 14 during concurrent gas/liquid backwash and excess liquid during liquid only backwash. The crescent-shaped baffle is more self-supporting (like an arch) than the other baffles and partitions described above. All partitions and baffles described herein may be made from stainless steel, fiberglass or similar corrosion-resistant materials.

Generally, the sizes and spacing for orifices 16, 20, 22, 32, 38 and 39 of the present invention must be calculated and designed according to the specific features of the installation with which the invention is to be used. Furthermore, certain applications of the invention will permit using two flume liquid metering orifices 16, one above the other, to accommodate varying flow rates during concurrent gas/liquid backwash. The details for this engineering will be apparent to those skilled in the art upon reading the instant specification. The following example is instructive in determining proper orifice size and spacing for two applications of the invention.

| | |
|---|---|
| I. Design Data | |
| Filter: | Two (2) bays with H-flume. |
| | Each bay 14'-0" × 38'-0", 532 sf. |
| Flume: | To feed both bays. |
| | 6'-0" wide × 4'-0" high. |
| | Bottom of flume and bottom of filter |
| | are on the same elevation. |
| Laterals: | Length, 14'-0". |
| | Number of laterals, 38 per bay. |
| Backwash: | Air only, 3 scfm/sf. |
| | Air/water concurrent, 3 scfm/sf air and |
| | 8 gpm/sf water. |
| | Water only, 20 gpm/sf |
| Underdrain: | Universal ® Type S ™ dual lateral |
| | underdrains with IMS ® Cap porous media |
| | retainer plates. |
| Media: | 72" above IMS ® Caps. |

General Operation

Referring to the embodiment shown in FIG. 13, an auxiliary flume is provided inside the main flume to allow for the passage of air to the underdrain laterals for air/water concurrent backwash. The water orifices at or near the bottom of the flume partition are designed to maintain a certain water depth in the main flume for uniform distribution of backwash water to the underdrain laterals during concurrent backwash.

For air scour with air only, the air/water interface in the main flume will drop to the same elevation as in the auxiliary flume. Air will flow above the partitions to the auxiliary flume and then through the flow distribution plate to the underdrain laterals.

For air/water concurrent backwash, water will be admitted to the main flume and will flow to the auxiliary flume through the water orifices in the partitions. Both air and water are measured through the orifices in the flow distribution plate to the underdrain laterals.

For water only backwash, water will flow to the auxiliary flume from the clearance 27 as well as through the water orifices in the partitions to the auxiliary flume, and then through the flow distribution plate to the laterals.

II. Air/Water Interface in Laterals

Test data with 6" and 24" of water above the Universal® Type S™ Blocks with IMS® Caps for concurrent backwash with 3 scfm/sf air and 8 gpm/sf water has indicated that the interface of air and water in the primary chamber of the lateral was 5.3" below the top of the block or 6.7" above the filter floor.

At the commencement of air/water concurrent backwash, the water level in the filter is usually 6" above the media, or 78" above the IMS® Caps in this case.

For 78" of water, the air/water interface in the primary chamber of the lateral for the same air and water flow rates is estimated to be 6.9" above the filter floor.

During "air only" backwash, the air/water interface will be slightly lower than that above.

III. Air Pressure in Laterals

Air pressure in the primary chamber of the lateral is equal to the sum of the pressure drop through the orifices in the lateral, the pressure drop through the IMS® Caps, and the water height above the IMS® Caps.

$$h=0.0463*(Q/CA)^2*P_2/T$$

Where
 h=Loss of head through orifices in lateral and Cap, inches of water.
 Q=Air flow rate in primary chamber, cfm.
 C=Orifice coeficient.
 A=Orifice area in primary and auxiliary chambers, and also in Cap, in$^2$.
 $P_2$=Pressure in primary chamber, psia.
 T=Absolute temperature of air in lateral.

From test results with 3 scfm/sf air and 8 gpm/sf water, $(CA)^2$ was found to be 0.000998 per foot of lateral.

Let p=Air pressure in primary chamber, in inches of water.

Then, for 1'-0" of lateral:
 h=p−78
 Q=3 scfm*14.7/(14.7+p/27.7)=1221.6/(p+407.2)
 $P_2$=p/27.7+14.7
 Assume air temperature in lateral is 68° F., then
 T=460+68=528
 p−78=0.0463*[(1221.6)/(p+407.2)]$^2$* (p/27.7+14.7)/(0.000998*528)
 Solve for p=87.6" of water.

This is the air pressure in the primary chamber with 78" of water above the IMS® Caps and when 3 scfm/sf air and 8 gpm/sf water are used for concurrent backwash.

IV. Air/Water Interface in Auxiliary Flume

Figure 1:
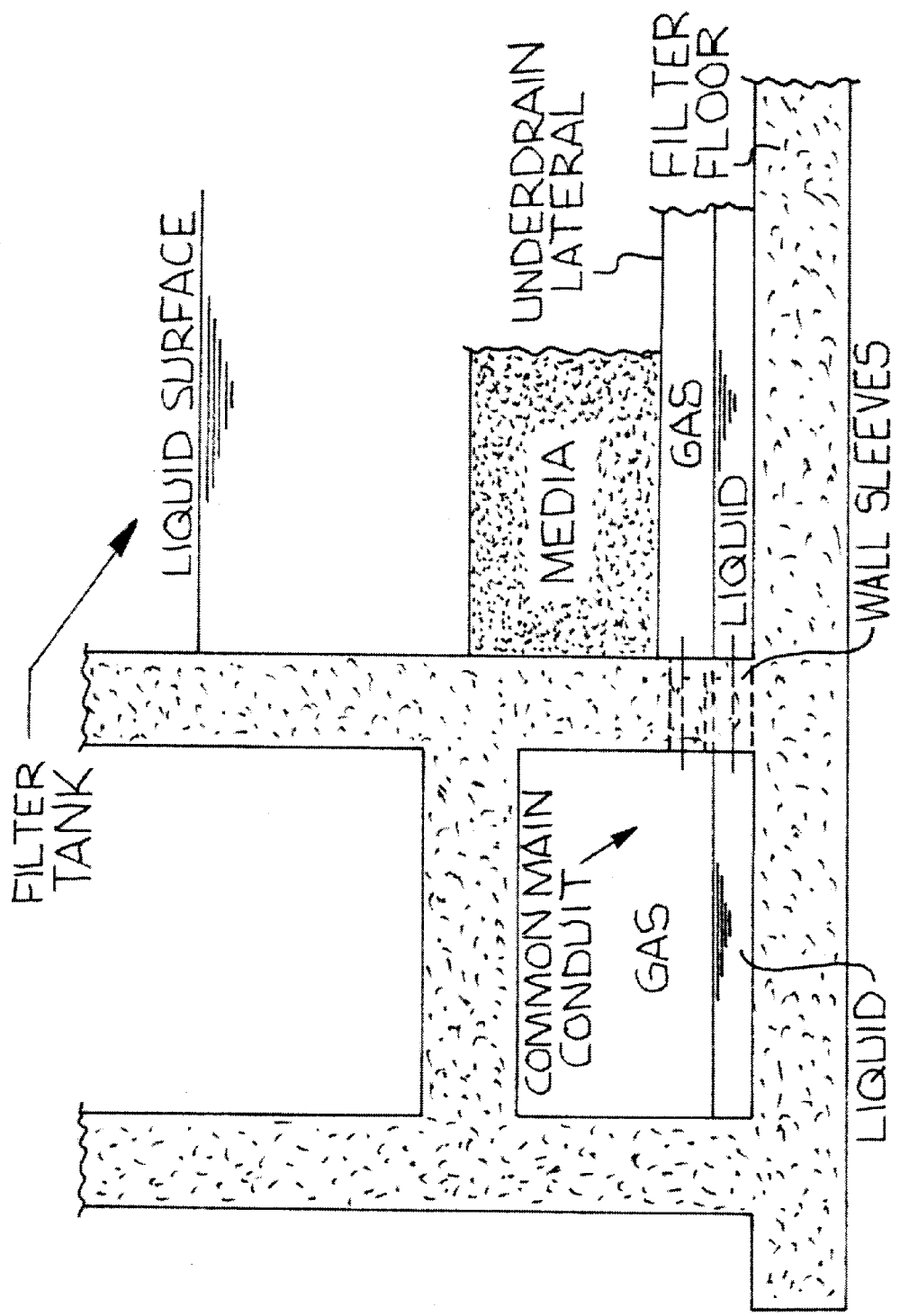
FIG. 1 is a schematic view of a filter having a flat bottom flume according to the prior art.
Figure 2:
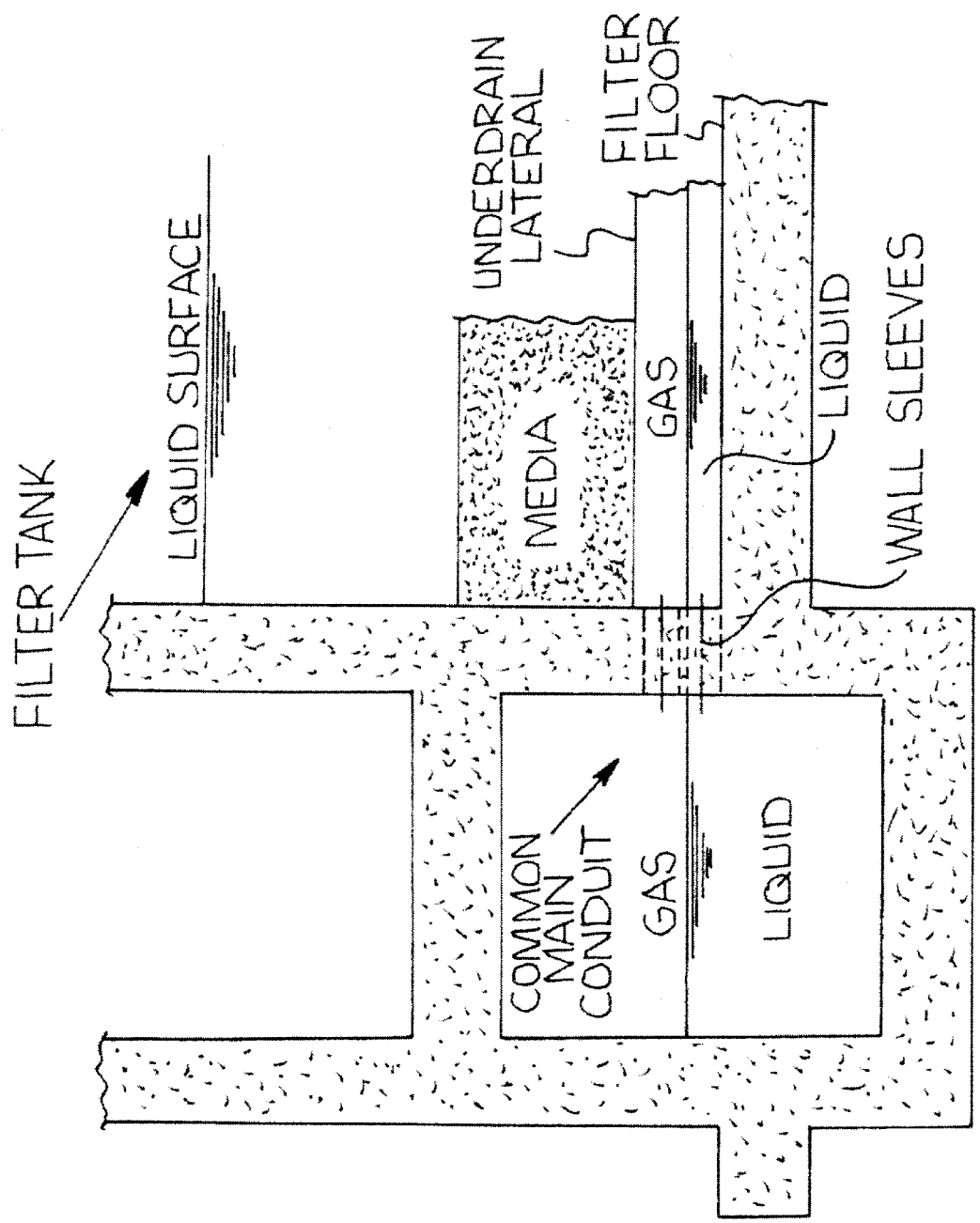
FIG. 2 is a schematic view of a filter having a recessed flume according to the prior art.
Figure 3:
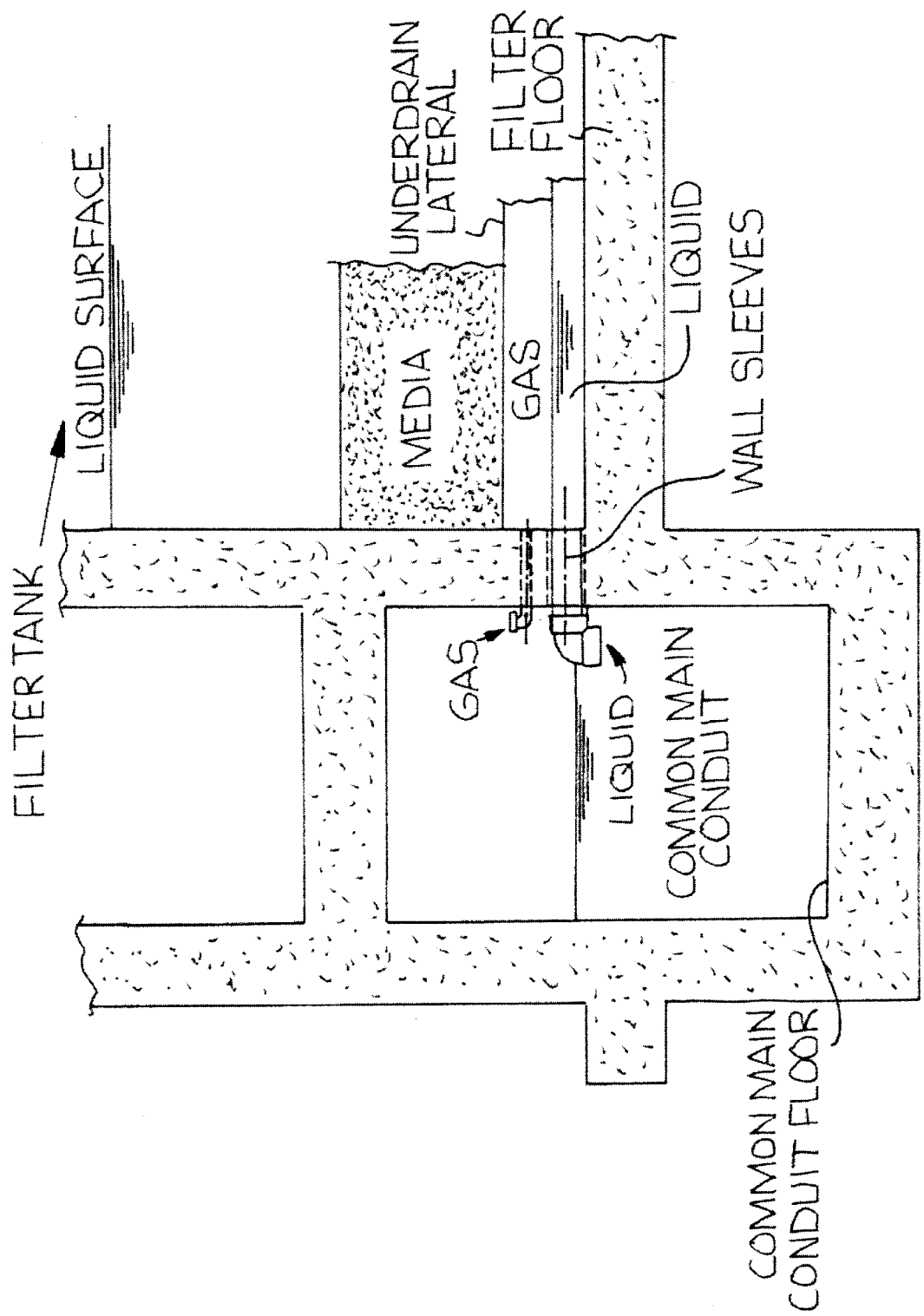
FIG. 3 is a schematic view of a filter having a fully excavated flume according to the prior art.
Figure 4:
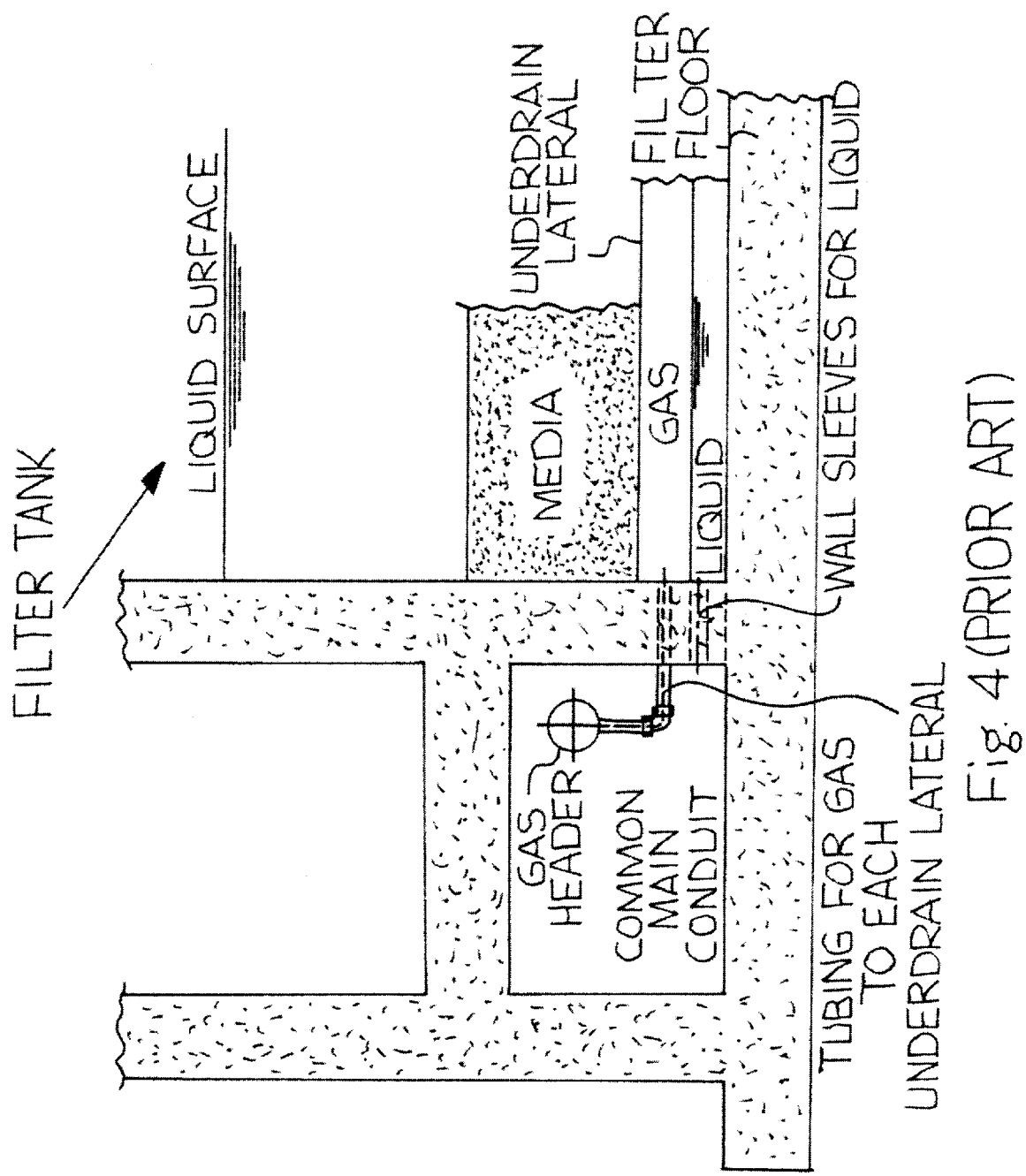
FIG. 4 is a schematic view of a filter having a flat bottom flume and a gas header inside the flume according to the prior art.
Figure 5:
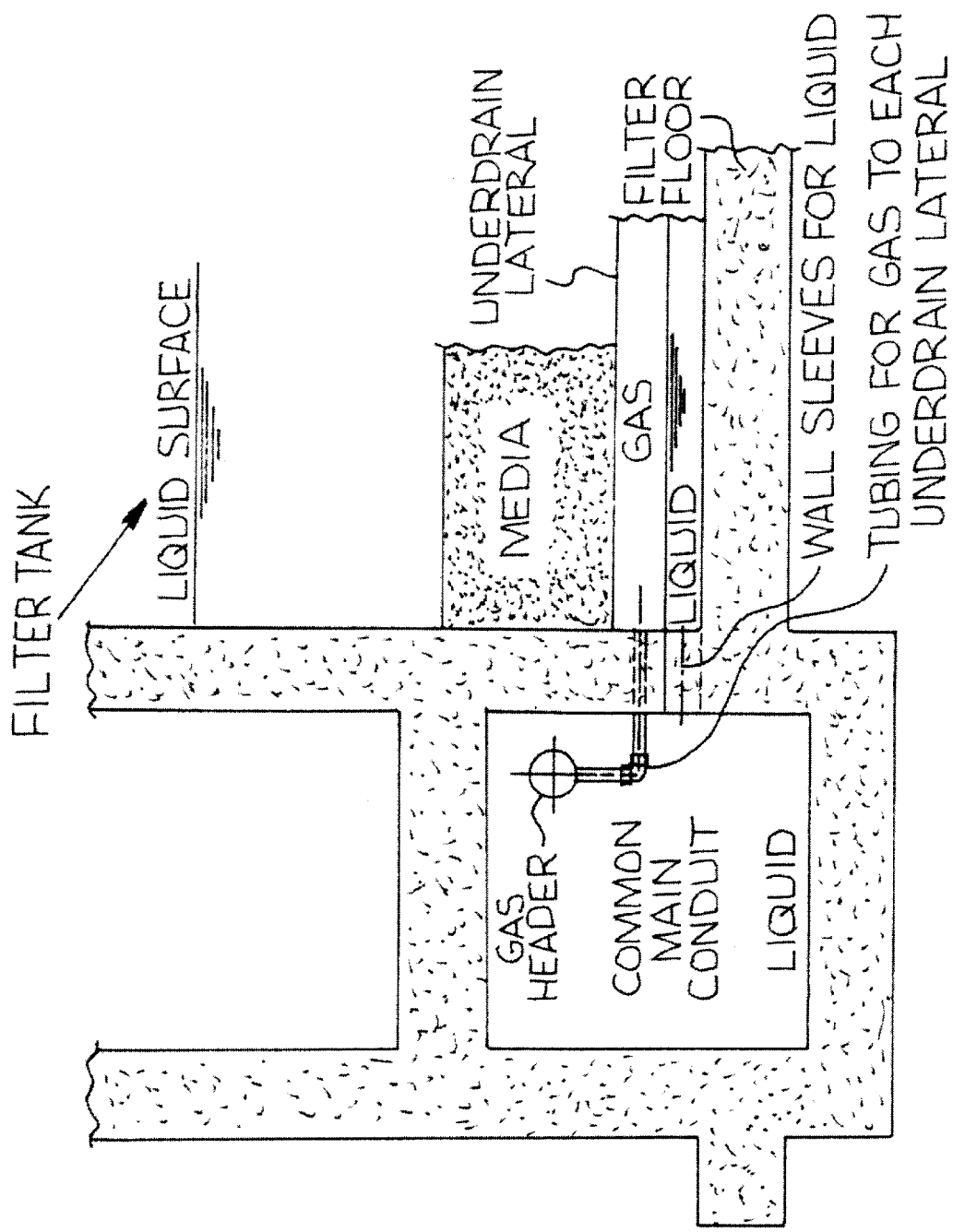
FIG. 5 is a schematic view of a filter having a recessed flume and a gas header inside the flume according to the prior art.
Figure 6:
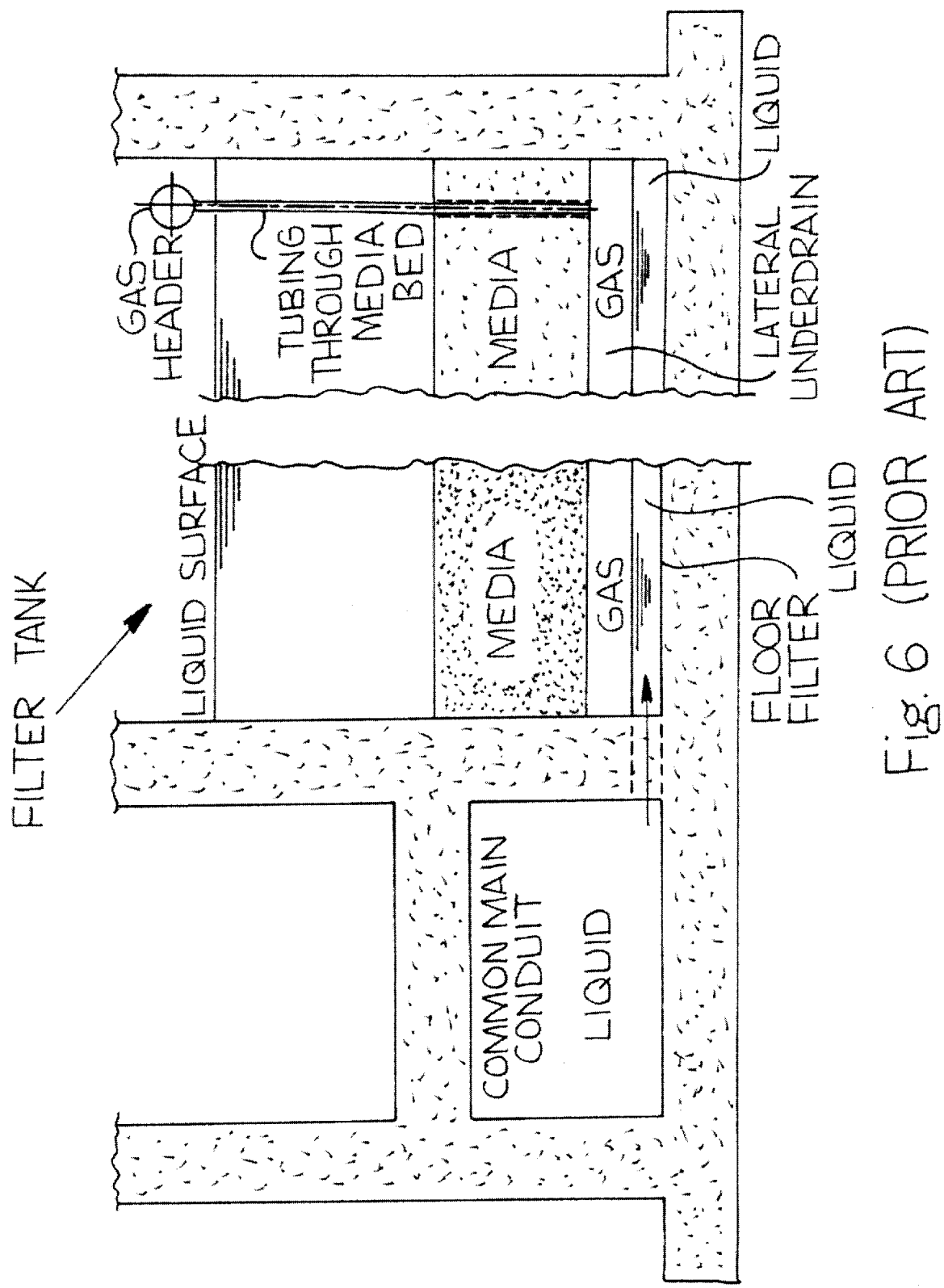
FIGS. 6 and 7 are schematic views of filters having gas headers with drop tubes through the media bed according to the prior art.
Figure 7:
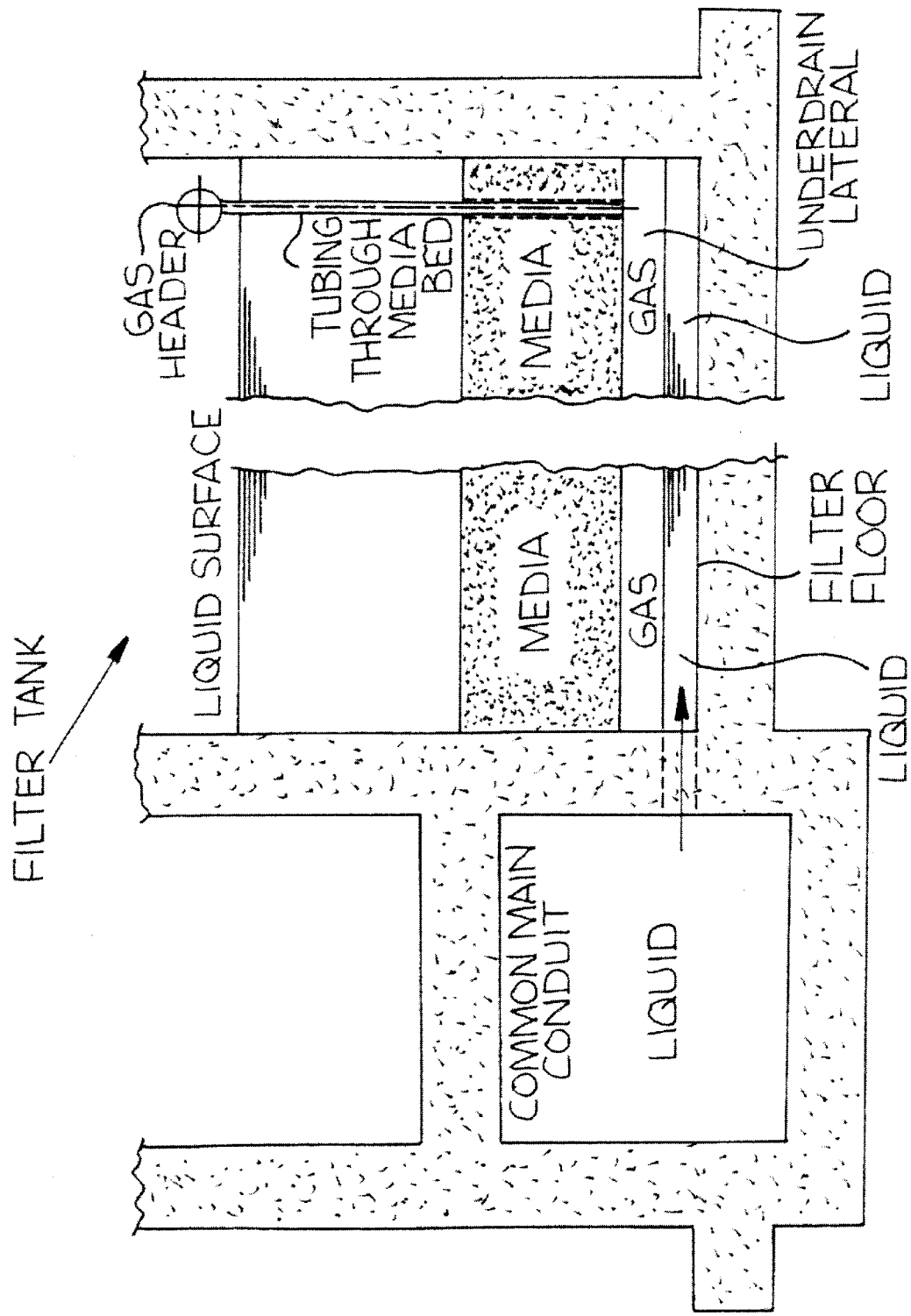
Figure 8:
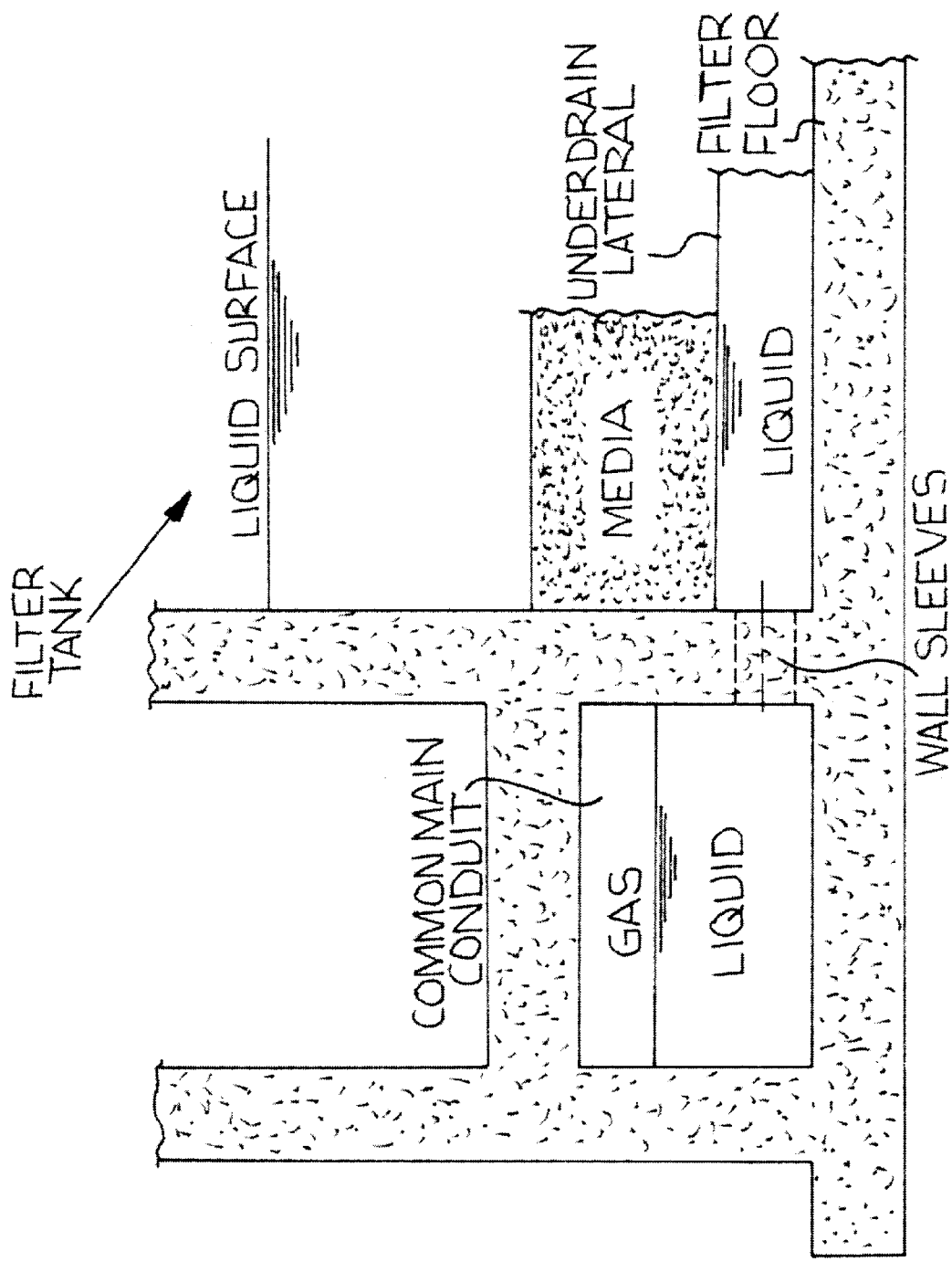
FIGS. 8 and 9 are schematic views of filters wherein a gas/liquid interface in the flume is too high to allow gas to pass into the filter tank in a prior art arrangement.
Figure 9:
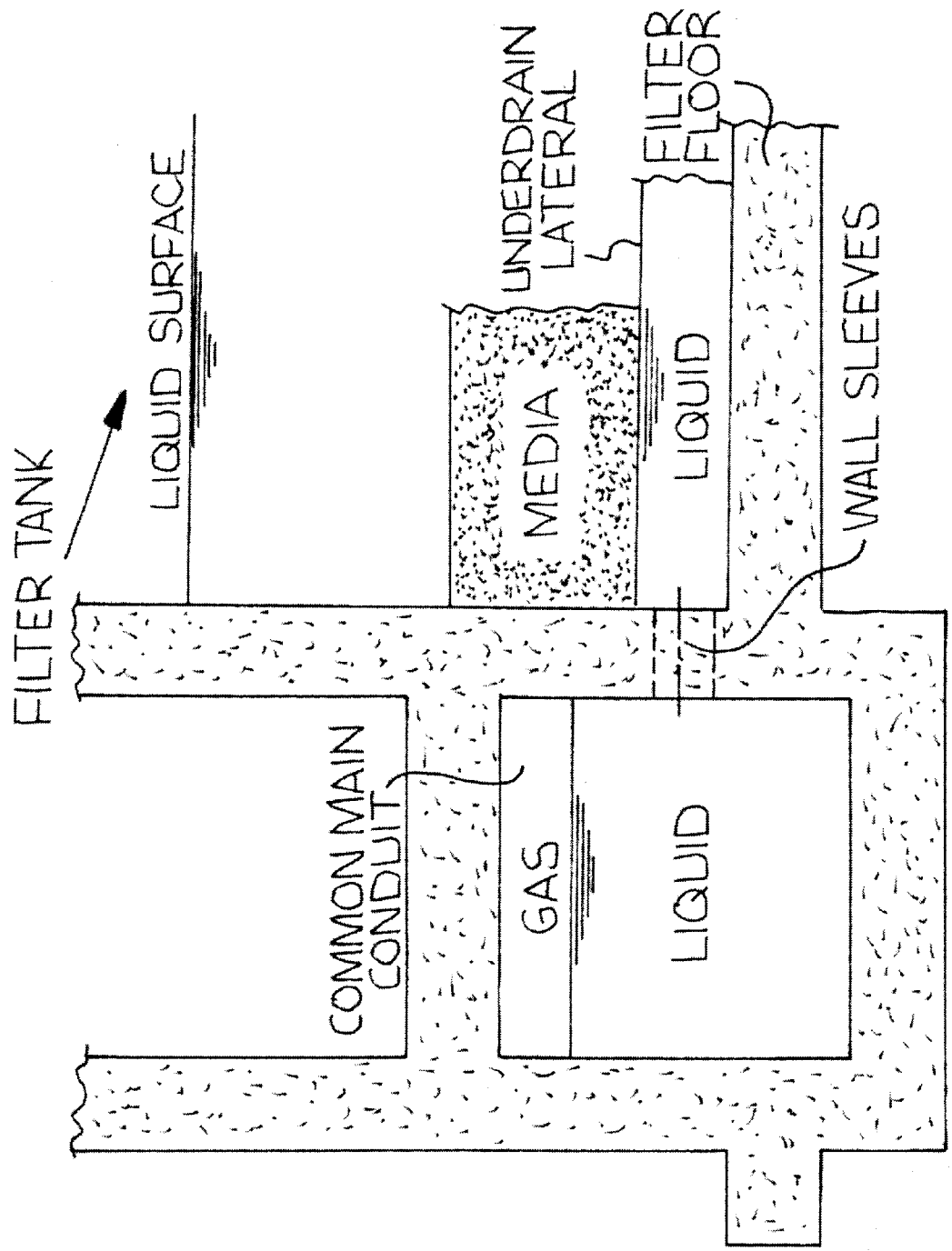
Figure 11:
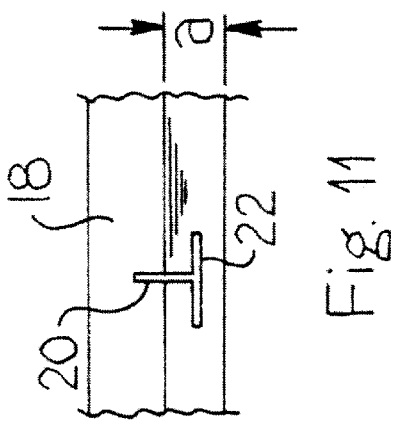
FIG. 11 is an elevational view of a flow distribution plate according to the invention.

Air and water will enter the lateral from the auxiliary flume through a distribution orifice plate as shown in FIG. 11. The air/water interface in the auxiliary flume should be maintained at approximately the same level as in the lateral so as to avoid splashing in the lateral.

Assume air pressure in the auxiliary flume=p inches of water.

For water, $$Q=CA\sqrt{(2gh)}$$

Where
 Q=8*14=112 gpm=0.2496 cfs
 C=0.62
 A=Area of water distribution orifice in flow distribution plates 18=15.175 in$^2$ =0.1054 ft$^2$
 h=(p−87.6)/12 ft.
 Therefore, $$0.2496=0.62*0.1054\sqrt{[2*32.2*(p-87.6)/12]}$$

Solve for p=90.32" of water.
For air, $$h=0.0463*(Q/CA)^2*P_2/T$$

(see III above).
Where
 h=90.32−87.6=2.72"
 Air flow=3*14=42 scfm
 Q=42*14.7/(14.7+90.32/27.7)=34.37 cfm
 C=0.65
 A=Orifice area, in$^2$
 $P_2$=14.7+90.32/27.7=17.96 psia
 T=528°
 Therefore, $$2.72=0.0463*(34.37/0.65A)^2*17.96/528$$

Solve for A=1.27 in$^2$

Extend the orifice (top of the slot) to 8.75" from the floor. The revised air pressure is 90.3" of water and the air/water interface is 7" from the floor.

V. Air/Water Interface in Flume

In order to maintain a reasonably good distribution of water to the laterals during concurrent backwash, the flow velocity of water in the flume should be maintained at not higher than 2 fps.

Filter area=532 sf/bay=1,064 sf/filter
 Concurrent water flow=8*1,064=8,512 gpm=18.97 cfs
 Width of main flume between baffles 26=4.33 ft.
 Therefore, the required water depth=18.97/(2*4.33)= 2.189' or 26.27"

VI. Concurrent Backwash Water Orifice

Since the bottom of the flume is on the same elevation as the filter floor, the water surface in the flume will have to be maintained at 26.27"−7" or 19.27" above the water surface in the auxiliary flume. A small orifice through the 4" concrete partition with headloss of 19.27" is therefore required to measure the water flow from the flume to the auxiliary flume for concurrent backwash.

$$Q=CA\sqrt{(2gh)}$$

Where

Q=112 gpm or 0.2496 cfs
C=0.62
h=19.27"=1.6'
0.2496=0.62*A* $\sqrt{(2*32.2*1.6)}$
A=0.0396 ft$^2$=5.7 in$^2$ Use 2$^{11}$/$_{16}$" diameter holes near bottom of partitions (flume liquid metering orifice 16)

VII. Alternate

Make partition with stainless steel plate instead of concrete as shown in FIG. 15. Width of main flume between the partitions 30 is 4.97 ft.

Air/Water Interface In Flume

Required water depth=18.97/(2*4.97)=1.91'=23"

Water Orifices Near Bottoms Of Partitions h=23−7=16"=1.333'
0.2496=0.62*A*$\sqrt{(2*32.2*1.333)}$
A=0.0434 ft$^2$=6.25 in$^2$ Use 2$^7$/$_8$" diameter holes 16 12" c/c.

The addition of a separator device according to the invention to common main conduit 12 is the most cost-effective means for the distribution of gas and liquid simultaneously to filter underdrain laterals 24 for concurrent gas and liquid backwash of filter media.

The invention also includes a method for introducing backwash gas and liquid to a filter having a filter tank during concurrent gas/liquid backwash. Gas and liquid are concurrently introduced to an enclosed flume position adjacent the filter tank, e.g., main conduit 12. A first gas/liquid interface 40 is established in the enclosed flume. Backwash liquid is then passed through at least one flume liquid metering orifice which is in fluid communication with the enclosed flume.

A second gas/liquid interface 42 is established in the enclosed flume. The second gas/liquid interface is positioned below the first gas/liquid interface. Backwash liquid is then passed into the filter tank through an opening in a filter tank wall separating the enclosed flume and the filter tank. Backwash gas is concurrently passed through an opening (for example, opening 39, or gas metering slot 20) which is above the second gas/liquid interface 42 and below the first gas/liquid interface 40, from the enclosed flume into the filter tank.

When a flow distribution plate 18 is present, the method includes the step of passing the backwash gas and backwash liquid through the flow distribution plate as it passes from the enclosed flume into the filter tank.

The method may also include the step of passing the backwash liquid through a separator device, such as the baffles or stand-pipes disclosed above, positioned in the enclosed flume to define the second gas/liquid interface. When stand-pipes are used as shown in FIGS. 17 and 18, the second gas/liquid interface would be established inside the stand-pipes just below opening 39.

The term "fluid" as used herein is meant to refer to liquid and/or gas.

Having described the presently preferred embodiments and best mode of the invention, certain variations and modifications may be made without departing from the spirit and scope of the invention. It is not intended to limit the invention except as set forth in the following claims.

What is claimed is:

1. A concurrent backwash distribution apparatus, comprising:

a filter having a filter tank, a flume positioned adjacent the filter tank and in fluid communication with the filter tank; and a separator device positioned in the flume so as to define an auxiliary flume between the separator device and the filter tank, the auxiliary flume in fluid communication with the flume and the filter tank, the separator device having at least one flume liquid metering orifice located in the separator device, the flume liquid metering orifice positioned so as to convey liquid from the flume to the auxiliary flume during a concurrent gas/liquid backwash operation in the filter.

2. The apparatus of claim 1 wherein the flume liquid metering orifice is positioned so as to be below a gas/liquid interface in the auxiliary flume during concurrent gas/liquid backwash.

3. The apparatus of claim 1 including a plurality of underdrain laterals positioned in the filter tank and a filter media bed positioned above the underdrain laterals with a flow distribution plate positioned between the auxiliary flume and the underdrain laterals, the flow distribution plate having at least one lateral liquid metering orifice and at least one gas metering orifice.

4. The apparatus of claim 3 wherein each lateral liquid metering orifice is contiguous with a corresponding gas metering orifice.

5. The apparatus of claim 1 wherein the separator device comprises a baffle which extends to a height which is less than a height of the flume to define a clearance above the baffle.

6. The apparatus of claim 1 including a plurality of flume liquid metering orifices in the separator device, each flume liquid metering orifice positioned adjacent a bottom of the separator device.

7. The apparatus of claim 1 including a filter tank wall separating the auxiliary flume and the filter tank, the filter tank wall having at least one opening therein for fluidly connecting the auxiliary flume with the filter tank.

8. The apparatus of claim 7 including a flow distribution plate positioned between the filter tank wall and the laterals, the flow distribution plate having at least one lateral liquid metering orifice and at least one gas metering orifice, both of which are in fluid communication with the opening in the filter tank wall.

9. The apparatus of claim 7 wherein the opening in the filter tank wall is sufficiently large to provide passage of both gas and liquid therethrough during the concurrent gas/liquid backwash operation.

10. The apparatus of claim 1 wherein the separator device comprises an upstanding partition positioned in the flume and spaced from a sidewall thereof.

11. The apparatus of claim 1 wherein the separator device comprises an inverted L-shaped partition having a vertical portion and an upper horizontal portion, the upper horizontal portion having a plurality of openings therein.

12. The apparatus of claim 1 wherein the separator device comprises at least one stand-pipe in the flume, the stand-pipe having a liquid metering orifice and a gas opening connecting the flume with the filter tank.

13. The apparatus of claim 12 including a wall sleeve connecting the stand-pipe with the filter tank.

14. The apparatus of claim 1 wherein the separator device is secured to a sidewall of the flume and has an upright L-shape.

15. The apparatus of claim 1 wherein the separator device is secured to a sidewall of the flume and has a crescent shape.

16. The apparatus of claim 1 wherein the flume has a floor which is at substantially the same elevation as a floor of the filter tank.

17. A concurrent backwash distribution apparatus, comprising:

a filter having a filter tank, with a plurality of underdrain laterals positioned in the filter tank;

a filter media bed positioned above the underdrain laterals;

a common main conduit positioned adjacent the filter tank and in fluid communication with the underdrain laterals; and a baffle positioned in the common main conduit so as to define an auxiliary flume between the baffle and the underdrain laterals, with the auxiliary flume in fluid communication with the common main conduit and the underdrain laterals, and with the baffle having at least one flume liquid metering orifice located in the baffle, wherein the flume liquid metering orifice is positioned so as to be below a gas/liquid interface in the auxiliary flume during a concurrent gas/liquid backwash operation in the filter, and wherein the baffle further defines at least one opening for passage of gas from the common main conduit into the auxiliary flume.

18. The apparatus of claim 17 including a flow distribution plate positioned between the auxiliary flume and the underdrain laterals, the flow distribution plate having a least one liquid metering orifice and at least one gas metering orifice, each liquid metering orifice being contiguous with a corresponding gas metering orifice.

19. The apparatus of claim 17 including a plurality of flume liquid metering orifices in the baffle, each flume liquid metering orifice positioned adjacent a bottom of the baffle.

20. The apparatus of claim 17 including a filter tank wall separating the auxiliary flume and the laterals, the filter tank wall having at least one opening therein for fluidly connecting the auxiliary flume with the laterals.

21. The apparatus of claim 20 wherein a flow distribution plate is positioned between the filter tank wall and the laterals, at least one liquid metering orifice and at least one gas metering orifice in the plate being in fluid communication with the opening in the filter tank wall.

22. The apparatus of claim 20 wherein the opening in the filter tank wall is sufficiently large to provide passage of both gas and liquid therethrough during the concurrent gas/liquid backwash operation.

23. The apparatus of claim 17 wherein the opening defined by the baffle for passage of gas into the auxiliary flume is a clearance above a top of the baffle.

24. The apparatus of claim 17 wherein the baffle is secured to a sidewall of the common main conduit.

25. The apparatus of claim 17 wherein the common main conduit has a floor which is at substantially the same elevation as a floor of the filter tank.

26. A concurrent backwash distribution apparatus, comprising:

a filter having a filter tank, with a plurality of underdrain laterals positioned in the filter tank;

a filter media bed positioned above the underdrain laterals;

a flume positioned adjacent the filter tank and in fluid communication with the underdrain laterals, with a floor of the filter tank having substantially the same elevation as a floor of the flume;

a stand-pipe positioned in the flume so as to define an auxiliary flume in fluid communication with the flume and the underdrain laterals, and with the stand-pipe having at least one flume liquid metering orifice located in the stand-pipe, along with a gas opening, wherein the stand-pipe connects the flume with at least one underdrain lateral in the filter tank;

a filter tank wall separating the auxiliary flume and the laterals; and a wall sleeve connecting the stand-pipe with the underdrain lateral for flow of gas thereto during concurrent gas/liquid backwash.

27. A method of introducing a backwash gas and a backwash liquid to a filter having a filter tank, the method comprising the steps of:

a) concurrently introducing the backwash gas and the backwash liquid into an enclosed flume;

b) establishing a first gas/liquid interface in the enclosed flume;

c) passing the backwash liquid through at least one flume liquid metering orifice which is in fluid communication with the enclosed flume;

d) establishing a second gas/liquid interface in the enclosed flume, the second gas/liquid interface positioned below the first gas/liquid interface;

e) passing the backwash liquid into the filter tank through an opening in a filter tank wall separating the enclosed flume and the filter tank; and f) passing the backwash gas through an opening which is above the second gas/liquid interface and below the first gas/liquid interface from the enclosed flume into the filter tank simultaneously with the backwash liquid.

28. The method of claim 27 including the step of passing the backwash gas and the backwash liquid through a flow distribution plate positioned between the enclosed flume and the filter tank.

29. The method of claim 27 including the step of passing the backwash liquid through a separator device positioned in the enclosed flume.

30. The method of claim 27 including the step of passing the backwash liquid and backwash gas into a plurality of underdrain laterals in the filter tank.

31. The method of claim 29 wherein the separator device is a baffle, the flume liquid metering orifice located in the baffle.

32. The method of claim 29 wherein the separator device is a stand-pipe.

* * * * *